(12) United States Patent
Lou et al.

(10) Patent No.: US 7,038,875 B2
(45) Date of Patent: May 2, 2006

(54) DYNAMIC MEASUREMENT OF HEAD MEDIA SPACING MODULATION

(75) Inventors: Huazhou Lou, Eden Prairie, MN (US); Zine-Eddine Boutaghou, North Oaks, MN (US)

(73) Assignee: Seagate Technology LLC, Scott Valley, CA (US)

( * ) Notice: Subject to any disclaimer, the term of this patent is extended or adjusted under 35 U.S.C. 154(b) by 173 days.

(21) Appl. No.: 10/631,919

(22) Filed: Jul. 31, 2003

(65) Prior Publication Data

US 2005/0024761 A1    Feb. 3, 2005

(51) Int. Cl.
    G11B 21/02    (2006.01)
(52) U.S. Cl. ....................................... 360/75
(58) Field of Classification Search ................ 360/75, 360/67, 31, 137, 77.02, 77.06, 77.07, 78.04, 360/78.06, 46, 66
    See application file for complete search history.

(56) References Cited

U.S. PATENT DOCUMENTS

| | | | |
|---|---|---|---|
| 4,777,544 A | | 10/1988 | Brown et al. |
| 5,130,866 A | | 7/1992 | Klaassen et al. |
| 5,168,413 A | * | 12/1992 | Coker et al. ............... 360/137 |
| 5,311,287 A | * | 5/1994 | Amer ......................... 356/614 |
| 5,377,058 A | | 12/1994 | Good et al. |
| 5,408,372 A | * | 4/1995 | Karam, II ................. 360/244.2 |
| 5,410,439 A | | 4/1995 | Egbert et al. |
| 5,673,110 A | * | 9/1997 | Erickson et al. ............ 356/507 |
| 5,751,510 A | * | 5/1998 | Smith et al. ................ 360/67 |
| 5,909,330 A | | 6/1999 | Carlson et al. |
| 6,008,176 A | * | 12/1999 | Schneider et al. .......... 510/361 |
| 6,008,640 A | * | 12/1999 | Tan et al. ................... 324/212 |
| 6,011,239 A | * | 1/2000 | Singh et al. ............. 219/121.6 |
| 6,191,901 B1 | | 2/2001 | Carlson et al. |
| 6,249,393 B1 | | 6/2001 | Billings et al. |
| 6,266,199 B1 | * | 7/2001 | Gillis et al. ................ 360/31 |
| 6,268,976 B1 | | 7/2001 | Carlson et al. |
| 6,288,856 B1 | * | 9/2001 | Ottesen et al. ............. 360/31 |
| 6,384,995 B1 | * | 5/2002 | Smith ......................... 360/31 |
| 6,415,238 B1 | * | 7/2002 | Ottesen et al. ............. 702/109 |
| 6,417,981 B1 | | 7/2002 | Smith |
| 6,452,735 B1 | | 9/2002 | Egan et al. |
| 6,459,539 B1 | | 10/2002 | Carlson et al. |
| 6,519,102 B1 | | 2/2003 | Smith et al. |
| 6,608,727 B1 | * | 8/2003 | Ottesen et al. ............. 360/31 |
| 6,611,389 B1 | * | 8/2003 | Liu et al. .................... 360/31 |

OTHER PUBLICATIONS

R.L. Wallace, Jr., The Reproduction of Magnetically Recorded Signals, pp. 1145-1173.

Klaas B. Klaassen, *Fellow*, IEEE, and Jack C.L. van Peppen, *Member, IEEE* Head-Medium Clearance and Lateral Track Registration of a Recording Head as Measured from the Readback Signal, Jan. 2001 pp. 575-582.

(Continued)

*Primary Examiner*—David Hudspeth
*Assistant Examiner*—Fred F. Tzeng
(74) *Attorney, Agent, or Firm*—Kinney & Lange, P.A.

(57) ABSTRACT

The present invention is a novel method and apparatus for determining head media modulation in a magnetic data storage and retrieval system. The magnetic data storage and retrieval system includes a magnetic disc with a stored signal and a transducing head for reading a readback signal based on the stored data. The system includes a data acquisition and processing circuit. The processing circuit generates a dynamic harmonic ratio for the readback signal. The processing circuit also generates a head media modulation signal as a function of time from the dynamic harmonic ratio.

20 Claims, 8 Drawing Sheets

OTHER PUBLICATIONS

Bruce C. Schardt, Erhard Schreck, Richard Sonnenfeld, Quinn Haddock and John R. Haggis, Flying Height Measurement while Seeking in Hard Disk Drives, Jul. 1998 pp. 1765-1767.

V.J. Novotny and M.-J. Hsiao, Sensitive Magnetic Readback Head—Disk Spacing Measurements in Recording Drives, Jul. 1998, pp. 1762-1764.

Robert Eaton and Michael Baldwinson, Imaging of Media Lubricant Spacing Contributions by Readback Signal Analysis, Jan. 1997, pp. 974-977.

Youping Deng, Hsiao-chu Tsai, and Brian J. Nixon, Drive-Level Flying Height Measurements and Altitude Effects, Nov. 1994, pp. 4191-4193.

W.K. Shi, L. Y. Zhu, and D. B. Bogy, Use of Readback Signal Modulation to Measure Head/Disk Spacing Variaitons in Magnetic Disk Files, Jan. 1987, pp. 233-240.

Y. Ohtsubo, N. Kawashima and H. Marumo, Measurement Method for the Spacing Fluctuation of a Head Slider in a Magnetic Disk Drive, Sep. 1987, pp. 3450-3452.

* cited by examiner

DYNAMIC MEASUREMENT OF HEAD MEDIA SPACING MODULATION

CROSS-REFERENCE TO RELATED APPLICATION(S)

None.

BACKGROUND OF THE INVENTION

The present invention relates to magnetic data storage and retrieval systems. In particular, the present invention relates to measuring head media spacing modulation.

As areal density of magnetic data storage systems continues to increase, it is critical to maintain a controlled spacing between the magnetic recording head and the recording media. The head media spacing modulation is a measure of the displacement of the head relative to the media and is an important aspect of the fly condition of a slider. Head media spacing modulation is often caused by media waviness, disc clamping distortion, write current induced pole tip protrusion, micro-actuator induced modulation, as well as other factors.

Often, it is desired to measure head media spacing to detect, for example, where there is a wave or defect in the media. One such indirect measurement is with the use of a laser doppler vibrometer (LDV). A LDV is mounted on the slider of a disc drive and it measures the slider motion on the backside of a slider. The process essentially first measures head media spacing modulation and disc motion in a vertical direction while the slider is flying at a normal height, and then second, measures the disc vertical motion without flying the slider. The difference between the two measurements is the head media spacing modulation. This indirect measurement cannot measure the actual spacing modulation at the pole tip and cannot measure the spacing change induced by write current.

Another technique used to measure head media spacing modulation is with use of a harmonic ratio. Such a technique to measure head media clearance is described in U.S. Pat. No. 4,777,544, which is incorporated by reference herein. With use of that disclosed method, the harmonic ratio of the readback signal is measured at normal fly height. The slider and head are then lowered to near contact by lowering disc speed, and the harmonic ratio is measured again at near contact. The head media clearance is then calculated at discrete locations based on the two harmonic ratio measurements. This static measurement of head media spacing can give a good measurement of the distance of the head to the media at any particular specified location.

An improved technique for measuring head media modulation is desired.

BRIEF SUMMARY OF THE INVENTION

The present invention is a novel method and apparatus for determining head media modulation in a magnetic data storage and retrieval system. The magnetic data storage and retrieval system includes a magnetic disc with a stored signal and a transducing head for reading a readback signal based on the stored data. The system includes a data acquisition and processing circuit. The processing circuit forms sampling intervals and calculates a harmonic ratio for the sampling intervals. The processing circuit generates a dynamic harmonic ratio for the readback signal using the harmonic ratio calculations. The processing circuit also generates a head media modulation signal as a function of time from the dynamic harmonic ratio.

DETAILED DESCRIPTION

Figure 1:
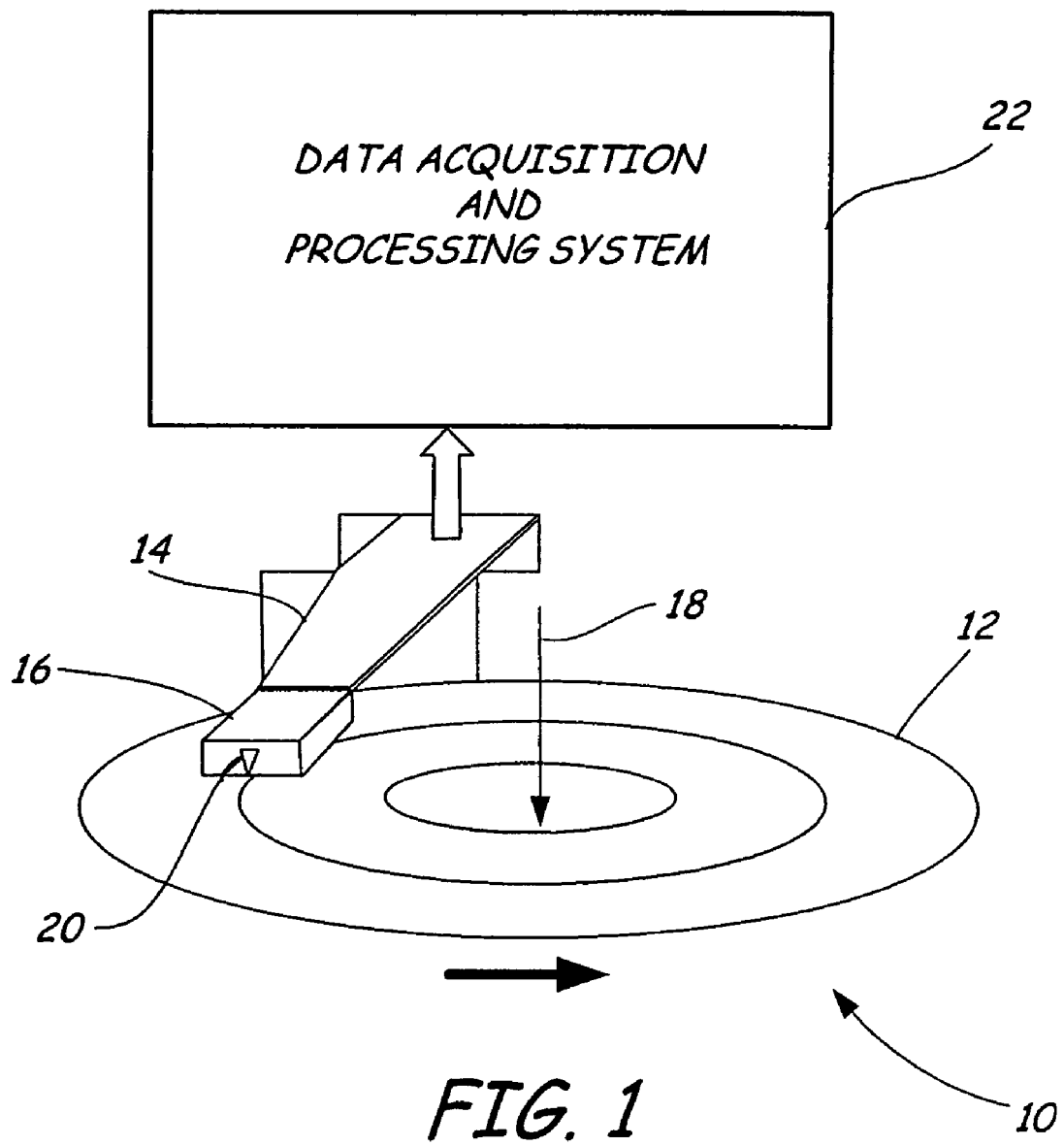
FIG. 1 is a diagram of a disc drive.

The present invention is particularly contemplated for use in a magnetic data storage and retrievable system such as disc drive 10 exemplified in FIG. 1. Disc drive 10 includes at least one magnetic disc 12, actuator arm 14, slider 16, transducing head 20, and data acquisition and processing system 22. Magnetic disc 12 is mounted on a drive spindle (not shown) and during use of disc drive 10 the drive spindle rotates disc 12 about axis 18 in the direction of the arrow shown in FIG. 2. As disc 12 rotates about axis 18, the aerodynamic properties of slider 16 cause it to "fly" above the surface of disc 12. Slider 16 is supported on a thin cushion of air between the surface of disc 12 and the air bearing surface of slider 16. Multiple discs and sliders may also be used in accordance with the present invention, but for simplicity a single structure is described.

A signal is stored on magnetic disc 12 as a plurality of magnetic transitions. As transducing head 20 passes over the recorded signal, a readback signal is generated and sent to data acquisition and processing system 22. Data acquisition and processing system (DAPS) 22 then digitizes and stores the readback waveform. DAPS 22 can be a general purpose data acquisition system used in combination with an external PC. Other similar dedicated hardware configurations could be used to process the data in accordance with the present invention.

The readback signal contains a fundamental frequency and higher harmonics. The ratio of the harmonic components is sensitive to head media spacing but less sensitive to environmental effects. According to Wallace Spacing Loss Model, the ratio of the third and the first harmonics are related to head media spacing by the following equation:

$$HR = Ce^{-4\pi(d/\lambda_1)} \qquad \text{EQUATION 1}$$

where HR is harmonic ratio, C is a constant, $\lambda_1$ is the fundamental d is head media spacing. Accordingly, head media spacing modulation can be calculated by calculating the ratio of the instantaneous amplitude of the fundamental frequency of the readback signal to the instantaneous amplitude of one of the harmonic frequencies of the readback signal. Head media spacing modulation is defined by:

$$\delta d = (-\lambda_1/4\pi)\delta Ln(HR) \qquad \text{EQUATION 2}$$

DAPS 22 comprises a high speed and large memory that is used to digitize the waveform of the readback signal. The entire signal is digitized for a period of time of interest, or a segment of disc 12 of interest. The readback signal may be recorded over an entire revolution of magnetic disc 12, over multiple revolutions, or over segments that are less than an entire revolution.

Figure 2:
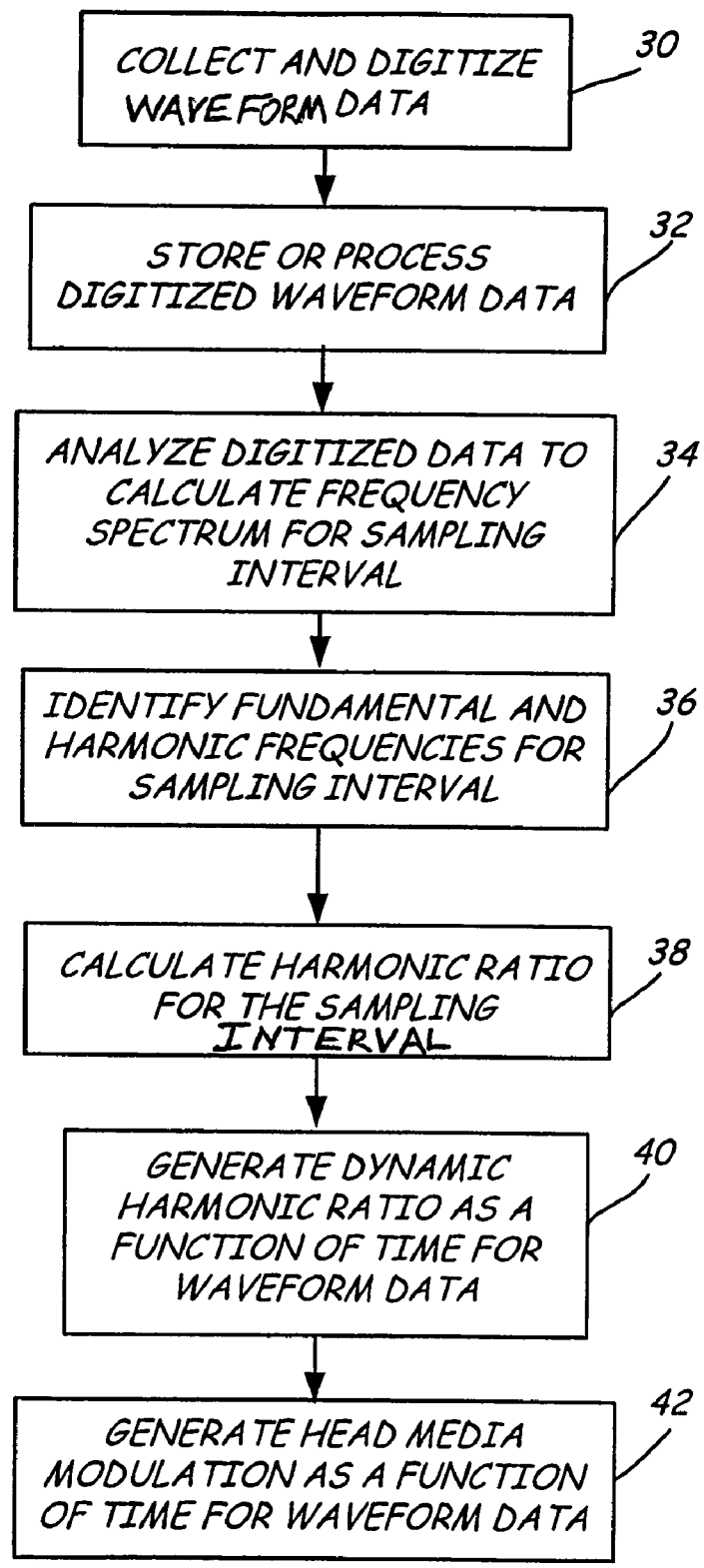
FIG. 2 is a block diagram representation of signals processed in accordance with the present invention.

FIG. 2 shows a block diagram of data processed with disc drive 10 in accordance with the present invention. As previously described, transducing head 20 passes over the magnetic media 12 reading the signal stored therein and the readback signal is sent to DAPS 22. Block 30 illustrates that DAPS 22 collects the readback signal and digitizes the collected data. The readback signal is an alternating signal that includes a fundamental frequency and higher harmonics. The magnetic pattern on the media may contain a variety of patterns that include high harmonics such as single or triple harmonic patterns. The digitized data may then be stored or processed, as indicated in block 32.

Once the readback waveform is digitized, the data is processed according to a selected sampling interval. The frequency spectrum of the readback signal over the selected sampling interval is calculated as depicted in block 34. The frequency spectrum and higher harmonics are calculated using fast Fourier transforms. This frequency calculation typically includes a determination of the instantaneous amplitude of the fundamental and harmonic frequencies of the readback signal over the sampling interval, as shown in block 36.

DAPS 22 then calculates the harmonic ratio by dividing the instantaneous amplitude of the fundamental frequency of the readback signal by the instantaneous amplitude of one of the harmonic frequencies of the readback signal, as indicated in block 38. By repeating these calculations for each sampling interval of the readback signal and plotting them as a function of time, a dynamic harmonic ratio for the readback signal is generated as indicated in block 40. Finally, by using Equation 2 above, the dynamic harmonic ratio can be used to calculate the head media modulation as a function of time, as indicated in block 42.

DAPS 22 processes data in accordance with the process described in FIG. 2, and DAPS 22 can be a general purpose data acquisition system used in combination with an external PC, or other electrical circuitry configured to do the same. This circuitry can be analog, digital or a combination thereof.

Figures 3A, 3B, 3C, 3D:
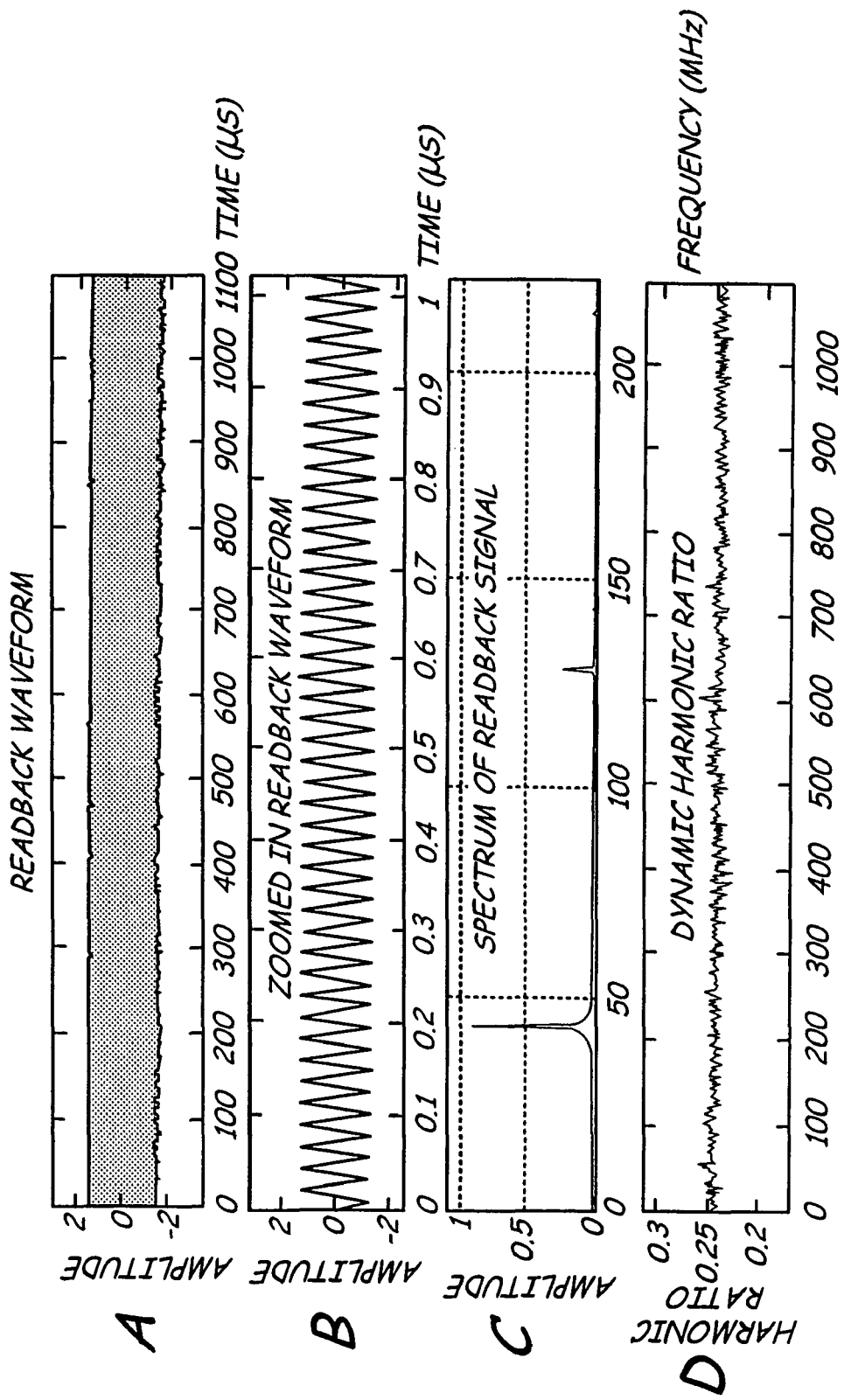
FIGS. 3–8 are representative signals processed in accordance of the present invention.

FIGS. 3A–3D shows an example of signals processed according to the present invention. FIG. 3A shows a readback waveform over 1,100 microseconds. In one illustrated embodiment, the readback signal is digitized over a 1,100 microsecond time period with a sample rate of 1 GHz. Because of the relatively high frequency of the readback signal over the sampled time period and the relatively high sample rate used, over a million data points are digitized and processed.

FIG. 3B illustrates a zoomed-in portion of the readback waveform for a single microsecond. The amplitude and readback signal are more readable in the zoomed-in format. In accordance with the present invention, the zoomed-in portion of the readback signal represents a sampling interval of the readback signal, which in this case is one microsecond. Using the 1 GHz sample rate for the readback signal produces 1000 data points for the selected sampling interval. These data points are then used to calculate the frequency spectrum for the sampling interval. Specifically, the frequency spectrum is derived from the digitized data for the sampling interval of the readback signal. This maybe accomplished by a fast Fourier transform, discrete Fourier transform, or any similar processing technique. FIG. 3C shows the calculated frequency spectrum of the readback signal for the sampling interval after application of such technique.

Next, data acquisition and processing system 22 calculates the harmonic ratio for the selected sampling interval by dividing the amplitude of the third harmonic frequency of the readback signal by the amplitude of the fundamental frequency of the readback signal. The calculated harmonic ratio for that sampling interval is then plotted as a single point on the dynamic harmonic ratio illustrated in FIG. 3D. In one embodiment, the sampling interval is one microsecond, so the calculated harmonic ratio for that sampling interval is a single point of the dynamic harmonic ratio plotted in FIG. 3D. The process of selecting a sample interval of a single microsecond, calculating the frequency spectrum for that sampling interval, calculating the harmonic ratio for that sampling interval, is repeated to produce multiple harmonic ratios. These multiple harmonic ratios are then plotted as a function of time to form the dynamic harmonic ratio for the readback signal. In FIG. 3D over 1,000 of these calculations are illustrated. The dynamic harmonic ratio is a compilation of the multiple calculated harmonic ratios plotted as a function of time.

In the present example, the harmonic ratio for the selected sampling interval was calculated by dividing the amplitude of the third harmonic frequency of the readback signal by the amplitude of the fundamental frequency of the readback signal. Any number of different harmonics and the fundamental frequency can also be used, to calculate the harmonic ratio and compile the dynamic harmonic ratio.

In forming the dynamic harmonic ratio, the sampling interval selected must be a small enough increment of time such that there is sufficient resolution to the dynamic harmonic ratio for the selected readback waveform in order to determine the frequency spectrum of the dynamic harmonic ratio. For example, in FIG. 3 the readback waveform selected is 1,100 microseconds, the sampling interval is one microsecond, giving sufficient resolution to the dynamic harmonic ratio over 1,100 microseconds. In this way, the frequency spectrum of the dynamic harmonic ratio may be calculated.

Figures 4A, 4B, 4C:
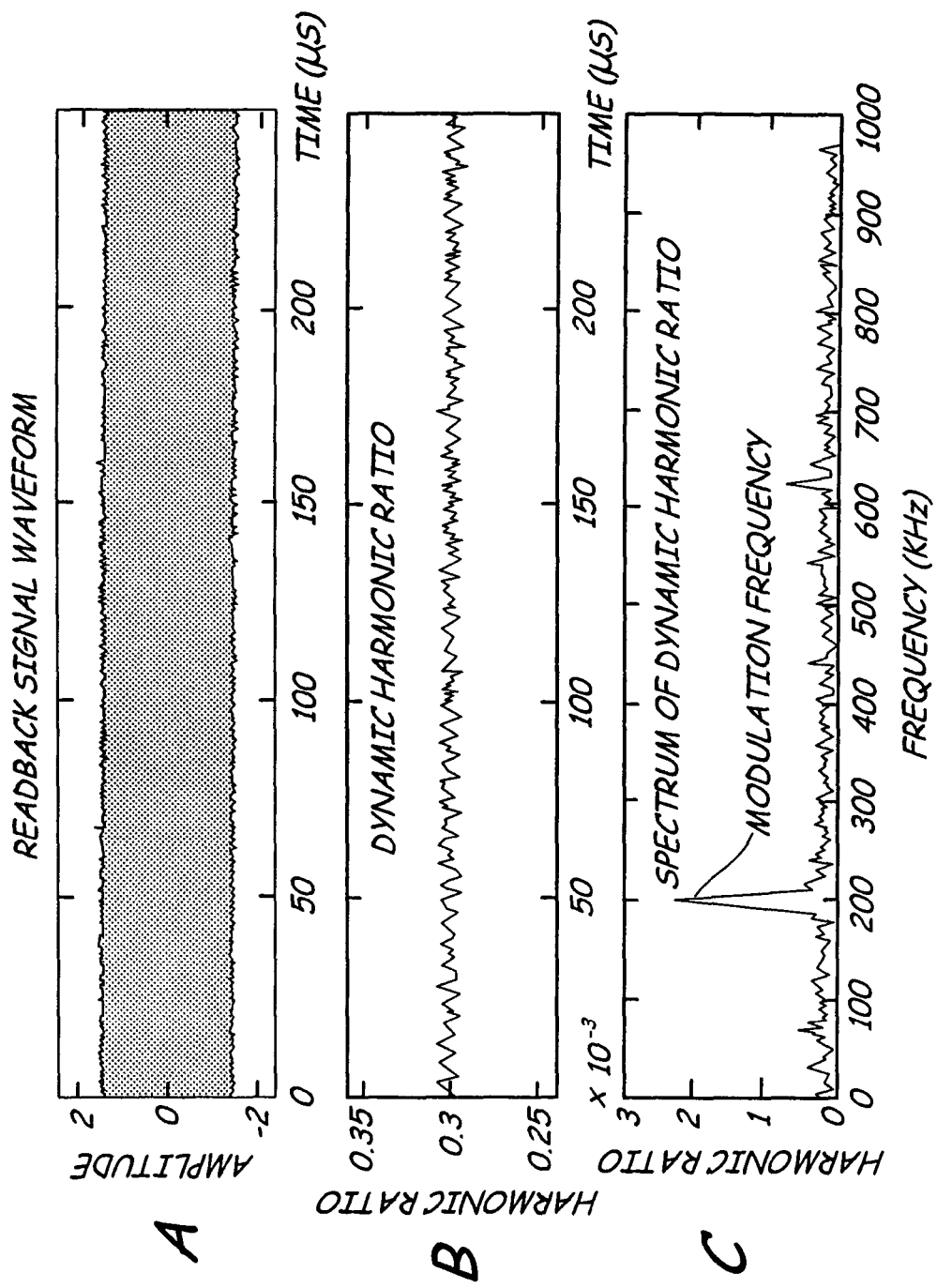

FIGS. 4A–4C show the calculation of the dynamic harmonic ratio and frequency spectrum thereof for one embodiment of the present invention. FIG. 4A shows a readback signal waveform over a 250 microsecond time period. Using a sampling interval of one half microsecond, the frequency spectrum of the readback signal for that sampling interval is calculated (individual calculations of the frequency spectrum not shown in FIGS. 4A–4C) to generate individual data points for a dynamic harmonic ratio. The process was then repeated 500 times to generate the dynamic harmonic ratio as a function of time as shown in FIG. 4B. Once the dynamic harmonic ratio as a function of time is generated, the frequency spectrum for the dynamic harmonic ratio can be calculated, again by using fast Fourier transforms or a similar technique. The frequency spectrum of the dynamic harmonic ratio is shown in FIG. 4C. As shown in FIG. 4C, the modulation frequency of the dynamic harmonic ratio is approximately 200 KHz. That modulation frequency can then be used to filter the dynamic harmonic ratio such that noise not attributable to head modulation can be eliminated from the dynamic harmonic ratio signal.

Figures 5A, 5B:
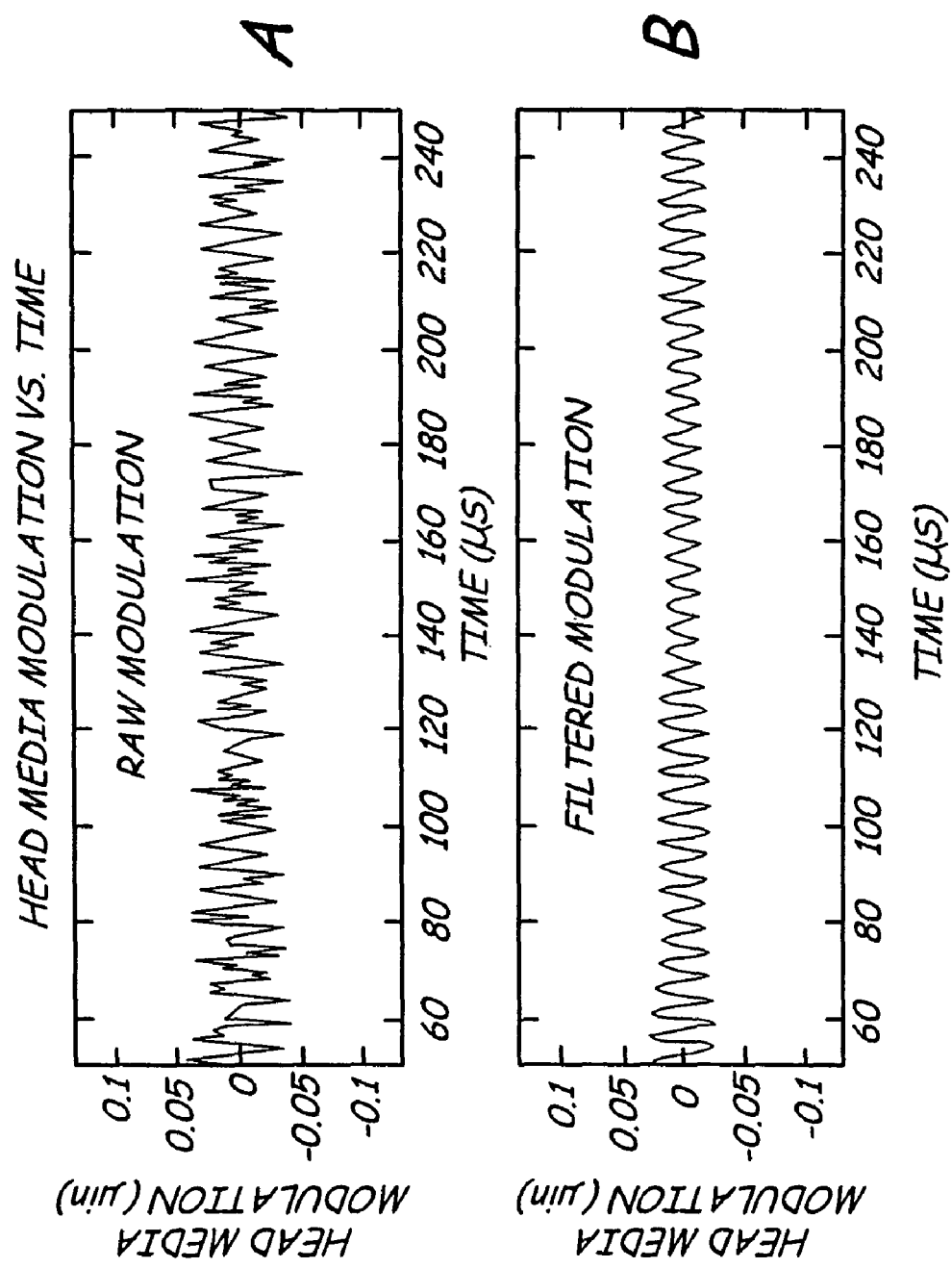

The calculated dynamic harmonic ratio can be converted to head media modulation with Equation 2 described above. For example, FIG. 4A shows a simulated readback signal containing 200 KHz 0.04 micro inch peak-to-peak sine wave modulation. The readback signal also contains noise with noise amplitude equal to 20 percent of the fundamental amplitude of the readback signal. The measured dynamic harmonic ratio oscillates with modulation as shown in FIG. 4B. The spectrum of the harmonic ratio shows the modulation frequency at 200 KHz (FIG. 4C). The dynamic harmonic ratio is then converted to head media modulation as a function of time with Equation 2 above. The result of this conversion is shown in FIG. 5A. Since modulation is usually a narrow band signal, it can be filtered to reduce noise. As shown in FIG. 5B the filtered modulation is close to a sine wave and has a peak-to-peak amplitude of about 0.038 micro inches which is very close to the original simulated modulation in the readback signal.

Given the relatively small-sized amplitude of the dynamic harmonic ratio, filtering out noise is especially important. Often, signal amplitude due to noise can be larger in amplitude than the actual modulation signal. Identification of the modulation frequency allows the modulation signal to be isolated from any modulation due to noise or other affects. In this way, the actual head modulation as a function of time can be analyzed over a particular time period of interest.

Figure 6:
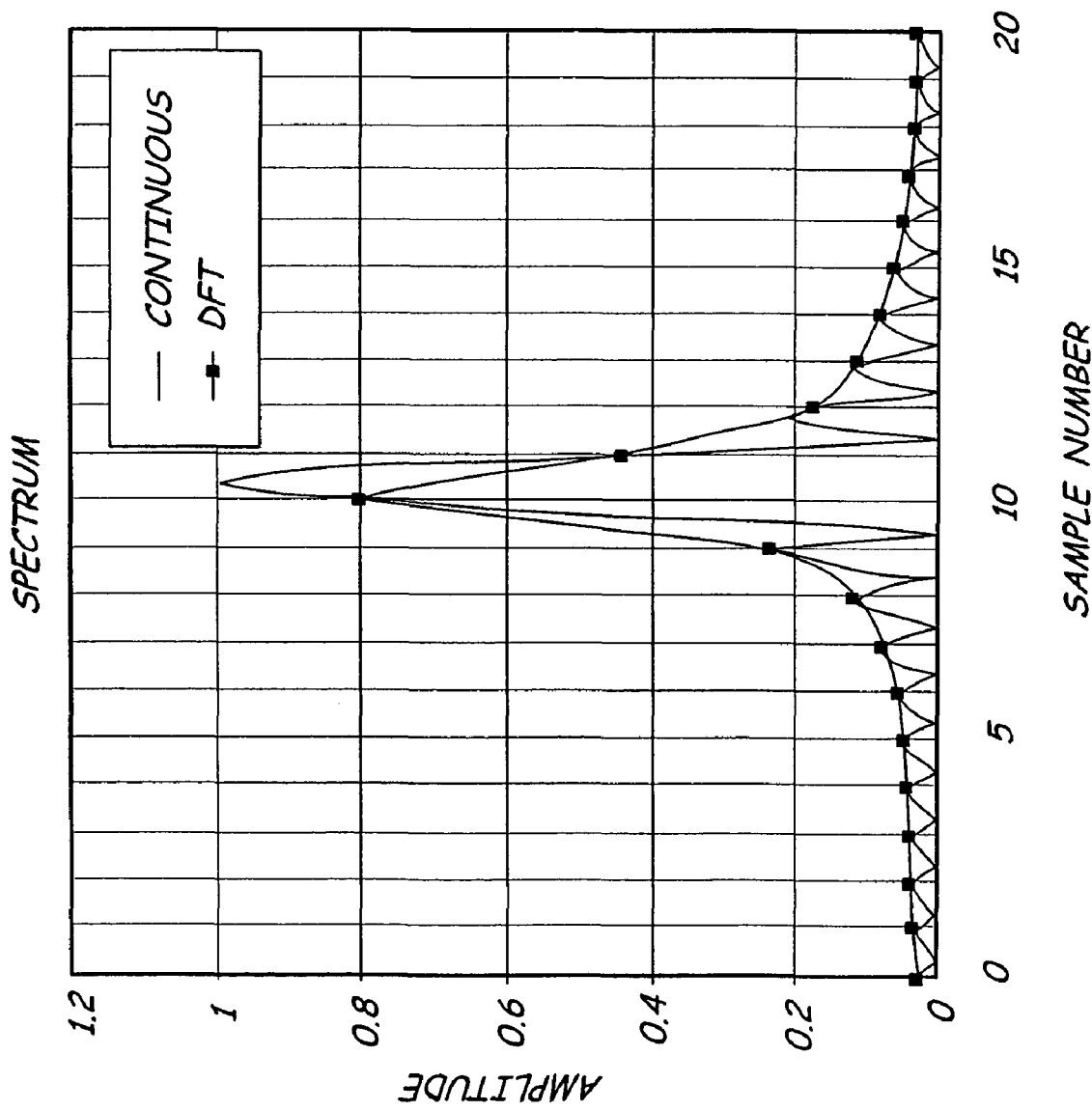
Figures 7A, 7B, 7C:
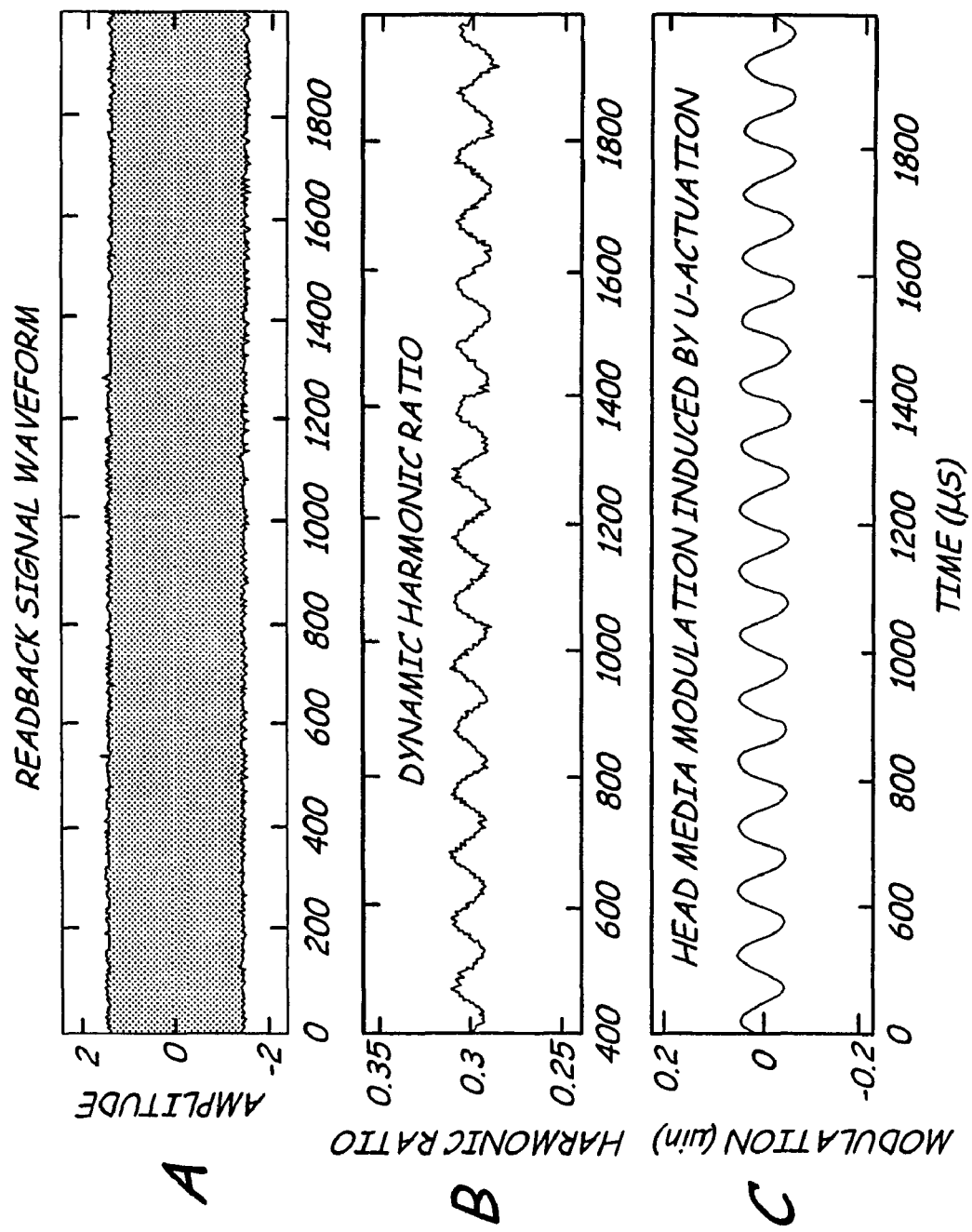

In calculating the instantaneous peak amplitude in the frequency spectrum of a sampling interval of the readback signal, limitations on signal length and frequency resolution affect the accuracy of the captured signals. Consequently, the true harmonic amplitude does not necessarily fall on the sampled points in the spectrum. For example, in FIG. 6 a single instantaneous peak of sample points of a frequency spectrum of a sampling interval of a readback signal is shown. The sample points are illustrated in the figure. As is evident, the instantaneous peak amplitude does not coincide with any one of the sample points. Thus, use of only the sample points in calculating the harmonic ratio will result in error. In order to eliminate this error, a least square curve fitting method is used to find the accurate harmonic amplitude with the sample spectrum data. In this way, the true instantaneous peak amplitude of the harmonic signal is used for both harmonic frequencies in order to obtain an accurate harmonic ratio. This technique can be used for each of the data points of the dynamic harmonic ratio as shown in FIG. 3D The measurement of head media modulation in accordance with the present invention has many advantages. By calculating dynamic harmonic ratio and head media modulation while introducing lateral head micro-actuation, the affect of the lateral head micro-actuation can be measured. Micro-actuation induced modulation typically has lower frequency and larger amplitude and this makes the measurement more accurate than high frequency low amplitude air bearing modulation. FIG. 7A shows the modulation induced by micro-actuation. The simulated readback signal contains 10 KHz 0.1 micro inch peak-to-peak modulation. The measured dynamic harmonic ratio oscillates with modulation as shown in FIG. 7B. The head media modulation induced by micro-actuation is shown in FIG. 7C. The measured modulation determined by use of the dynamic harmonic ratio in accordance with the present invention, has peak-to-peak amplitude of 0.099 micro inch that matches the modulation in the simulated readback signal.

Figures 8A, 8B, 8C:
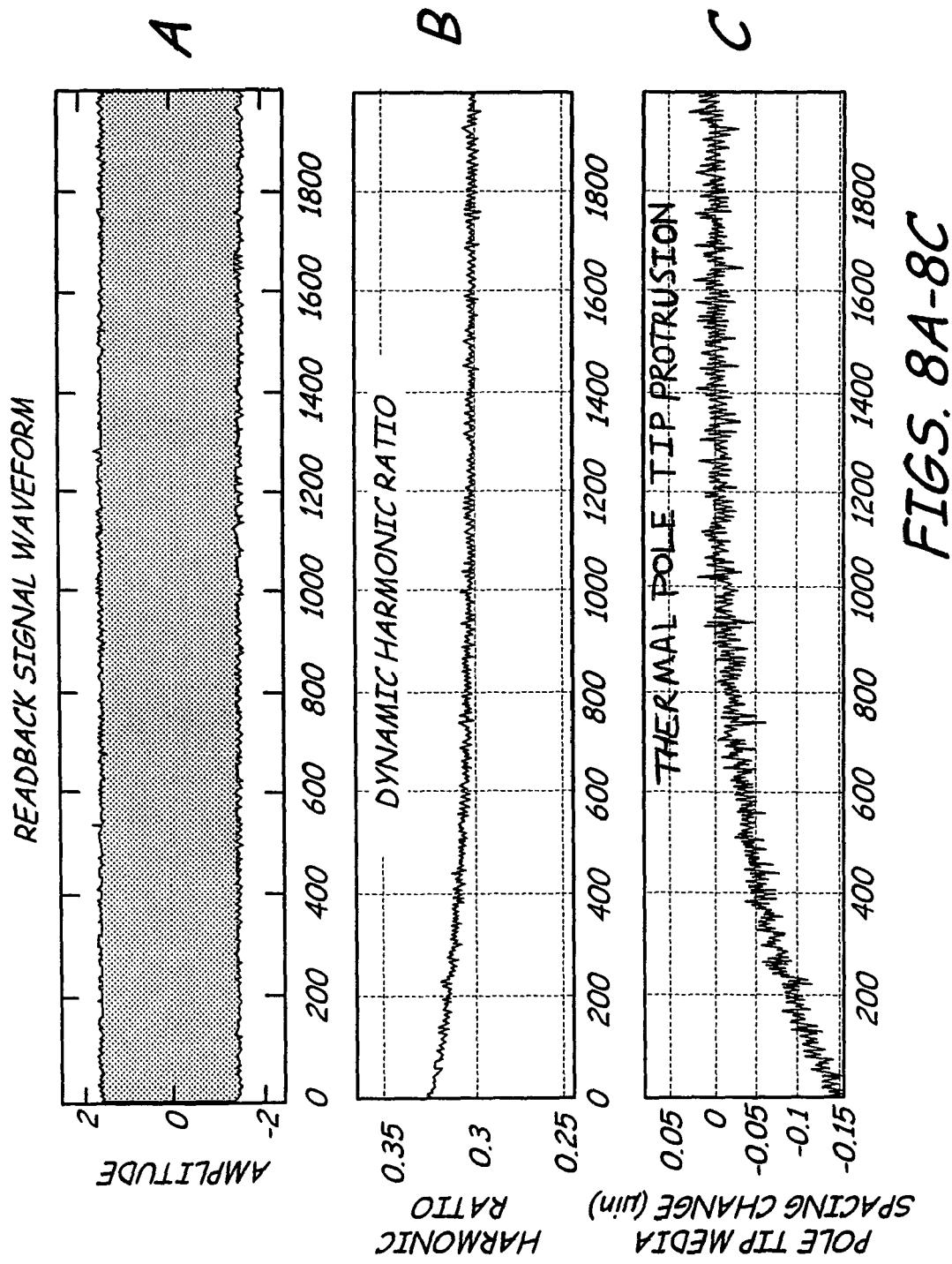

Another useful application of dynamic harmonic ratio is in measurement of thermal pole tip protrusion. As shown in FIGS. 8A–8C, before times zero, the head is heated to an elevated temperature by some method such as by turning on a writer current. At time zero, the heat source is removed, such as by turning off the writer current, and dynamic harmonic ratio measurement starts. In the simulation, 0.15 micro inch thermal pole tip protrusion with 0.4 millisecond cooling time constant are applied to the readback signal. A noise level equal to 20 percent of the fundamental readback amplitude is also applied to the readback signal. The measured dynamic harmonic ratio captures the pole tip media spacing change during the cooling process. The thermal pole tip protrusion is measured as 0.15 micro inch and that matches the original thermal pole tip protrusion applied to the readback signal.

Although the present invention has been described with reference to preferred embodiments, workers skilled in the art will recognize that changes may be made in form and detail without departing from the spirit and scope of the invention.

What is claimed is:

1. A magnetic data storage and retrieval system comprising:
    a rotatable magnetic disc having a readback signal stored over a section of the magnetic disc;
    a transducing head for reading the readback signal from the magnetic disc, the transducing head being positioned to fly at a fly height with respect to the magnetic disc when the magnetic disc is rotated;
    means for processing the readback signal to calculate a dynamic harmonic ratio as a function of time; and
    means for calculating head media modulation as a function of time from the dynamic harmonic ratio.

2. The magnetic data storage and retrieval system of claim 1 wherein the means for processing the readback signal to calculate a dynamic harmonic ratio includes forming sampling intervals and calculating a harmonic ratio measurement for each of the sampling intervals.

3. The magnetic data storage and retrieval system of claim 2 wherein the sampling intervals are 1 microsecond or shorter.

4. The magnetic data storage and retrieval system of claim 1 wherein the means for processing the readback signal to calculate a dynamic harmonic ratio includes digitizing the readback signal using a 1 GHz or faster sampling rate.

5. The magnetic data storage and retrieval system of claim 1 further comprising means for determining a frequency spectrum of the dynamic harmonic ratio.

6. A magnetic data storage and retrieval system comprising:
    a rotatable magnetic disc having data stored therein;
    a transducing head for reading a readback signal representative of the data from the magnetic disc as the transducing head is flying above the magnetic disc as the magnetic disc is rotated;
    a data acquisition circuit for digitizing the readback signal; and
    a processing circuit for (a) calculating a frequency spectrum of the readback signal for each of multiple selected sampling intervals of the readback signal, (b) calculating a harmonic ratio for each of the selected sampling intervals based on the calculated frequency spectrum for each of the selected sampling intervals, (c) generating a dynamic harmonic ratio for the readback signal from the harmonic ratio calculations, and (d) generating a head media modulation signal as a function of time from the dynamic harmonic ratio.

7. The magnetic data storage and retrieval system of claim 6 wherein the processing circuit determines a frequency spectrum of the dynamic harmonic ratio.

8. The magnetic data storage and retrieval system of claim 7 wherein the processing circuit determines a modulation frequency of the dynamic harmonic ratio for the readback signal.

9. The magnetic data storage and retrieval system of claim 8 wherein the processing circuit filters the head media modulation signal using the determined modulation frequency.

10. The magnetic data storage and retrieval system of claim 6 wherein the processing circuit calculates the harmonic ratio by dividing an instantaneous peak amplitude of a harmonic frequency of the readback signal by an instantaneous peak amplitude of a fundamental frequency of the readback signal.

11. The magnetic data storage and retrieval system of claim 10 wherein the processing circuit calculates the instantaneous peak amplitude of the fundamental and harmonic frequencies of the readback signal using a least squares curve fitting method.

12. The magnetic data storage and retrieval system of claim 6 wherein the processing circuit calculates the harmonic ratio by dividing an instantaneous peak amplitude of a third hormonic frequency of the readback signal by an instantaneous peak amplitude of a fundamental frequency of the readback signal.

13. A method for determining a dynamic harmonic ratio for an entire readback signal in a data storage and retrieval system comprising:
  rotating a magnetic disc having a readback signal stored therein;
  reading the readback signal from the magnetic disc with a transducing head being positioned above the magnetic disc when the magnetic disc is rotated;
  storing the readback signal;
  calculating a frequency spectrum of the readback signal for each of multiple selected sampling intervals of the readback signal;
  calculating a harmonic ratio for each of the selected sampling intervals based on the calculated frequency spectrum for each of the selected sampling intervals; and
  generating a dynamic harmonic ratio for the readback signal from the harmonic ratio calculations; and
  generating a head media modulation signal as a function of time from the dynamic harmonic ratio.

14. The method of claim 13 further including determining a frequency spectrum of the dynamic harmonic ratio.

15. The method of claim 14 further including determining a modulation frequency of the dynamic harmonic ratio for the readback signal.

16. The method of claim 15 further including filtering the head media modulation signal using the determined modulation frequency.

17. The method of claim 13 further including calculating the harmonic ratio by dividing an instantaneous peak amplitude of a fundamental frequency of the readback signal by an instantaneous peak amplitude of harmonic frequency of the readback signal.

18. The method of claim 17 further including calculating the instantaneous peak amplitude of the fundamental and harmonic frequencies of the readback signal using a least squares curve fitting method.

19. The method of claim 13 further including calculating the harmonic ratio by dividing an instantaneous peak amplitude of a third harmonic frequency of the readback signal by an instantaneous peak amplitude of a fundamental frequency of the readback signal.

20. The method of claim 13 further including digitizing the readback signal.

* * * * *

UNITED STATES PATENT AND TRADEMARK OFFICE
CERTIFICATE OF CORRECTION

PATENT NO. : 7,038,875 B2
APPLICATION NO. : 10/631919
DATED : May 2, 2006
INVENTOR(S) : Huazhou Lou et al.

It is certified that error appears in the above-identified patent and that said Letters Patent is hereby corrected as shown below:

Column 3, Line 55, delete "maybe", insert --may be--

Signed and Sealed this

Twenty-sixth Day of December, 2006

JON W. DUDAS
*Director of the United States Patent and Trademark Office*